United States Patent [19]
Wilson et al.

[11] Patent Number: 4,615,407
[45] Date of Patent: Oct. 7, 1986

[54] FLEXIBLE ANNULAR JET SEAL FOR SURFACE EFFECT VEHICLES

[75] Inventors: Freddie W. Wilson, Mt. Airy, Md.; Harvey J. Howe, Reston, Va.; James H. Nichols, Jr., Hyattsville, Md.

[73] Assignee: The United States of America as represented by the Secretary of the Navy, Washington, D.C.

[21] Appl. No.: 715,782

[22] Filed: Mar. 25, 1985

[51] Int. Cl.[4] .................... B60V 1/04; B60V 1/10
[52] U.S. Cl. .................... 180/128; 180/129; 180/130; 114/67 A
[58] Field of Search ............ 180/126, 127, 128, 129, 180/130; 114/67 A

[56] References Cited
U.S. PATENT DOCUMENTS

| | | | |
|---|---|---|---|
| 3,424,266 | 1/1969 | Cockerell | 180/127 X |
| 3,532,176 | 10/1970 | Williams | 180/126 |
| 3,811,527 | 5/1974 | Pont et al. | 180/121 |
| 3,850,126 | 11/1974 | Leonard | 114/67 A |
| 3,907,061 | 9/1975 | Chapman et al. | 180/128 X |
| 4,042,060 | 8/1977 | Bertin et al. | 180/127 |

*Primary Examiner*—John A. Pekar
*Attorney, Agent, or Firm*—Robert F. Beers; Ervin F. Johnson

[57] ABSTRACT

An improved bow and/or stern seal is provided for a surface effect vehicle wherein the vehicle has a pair of spaced apart side hulls which are joined by a wet deck, and the bow and stern seals extend between the side hulls so that an air cushion can be formed between the side walls and the bow and stern seals. The improved seal includes a portion of the deck having an opening for providing an air inlet to the air cushion. An elongated pneumatic bag is mounted along its length to the bottom of the wet deck, is sealed at its ends and is positioned to receive air from the deck opening along its forward side. Provision is made for a passageway between the side hulls for directing air around the forward side of the bag.

19 Claims, 6 Drawing Figures

FLEXIBLE ANNULAR JET SEAL FOR SURFACE EFFECT VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to improved seals for a surface effect vehicle.

The U.S. Navy has undertaken a considerable amount of research on the surface effect ship (SES) which is characterized by its hard catamaran-like side hulls with bow and stern seals. With this arrangement an air cushion is obtainable between the side hulls and the seals for positioning the vehicle above the surface of the water.

There have been various designs of bow and stern seals ranging from fully flexible seals to partially rigid seals. Various embodiments of bow and stern seals are illustrated in the following patents: U.S. Pat. No. 4,137,987 to Plackett; U.S. Pat. No. 4,215,756 to Hunt; U.S. Pat. No. 4,285,414 to Malakhoff et al; U.S. Pat. No. 3,410,241 to Hardy et al; U.S. Pat. No. 3,424,266 to Cockerell; and U.S. Pat. No. 4,000,710 to Crago. The purposes of a bow or stern seal are: (1) to minimize leakage from the pressurized air cushion region to the atmosphere and thereby minimize cushion air flow power requirements; (2) absorb wave impacts and thereby reduce structural loads; and (3) provide restoring forces to maintain pitch stability.

In order to prevent excessive cushion air leakage to the atmosphere it is necessary that a bow or stern seal follow the high frequency smaller wave surfaces as well as the larger wave surfaces. This requires that the lower end of the seal be made of some highly flexible material. However, because of the highly dynamic environment at the lower end of the seal the flexible material rapidly wears so that replacement becomes a large factor in the operational cost and durability of the surface effect vehicle. There is a need for a flexible seal which is configured to minimize wear due to wave action.

SUMMARY OF THE INVENTION

The invention is an improved bow and/or stern seal for a surface effect vehicle wherein the vehicle has a pair of spaced apart side hulls joined by a wet deck, and the bow and stern seals which extend between the side hulls so that an air cushion can be formed between the side hulls and the bow and stern seals. The improved seal includes a portion of the deck having an opening for providing an air inlet to the air cushion. An elongated pneumatic bag is mounted along its length to the bottom of the wet deck, is sealed at its ends, and is positioned to receive air from the deck opening along its forward side. Provision is made for a passageway for directing air around the forward side of the pneumatic bag. With this arrangement the pneumatic bag provides a cushion to wave action shock loading so that wear on the seal is minimized. A fan may be located between the deck opening and the forward side of the pneumatic bag for forcing air from the deck opening into the passageway. In one embodiment of the invention the passageway may be a flexible nozzle which receives air from the deck opening and curves around the forward side of the pneumatic bag. In other embodiments of the invention the deck may have a partial annular passageway located about a top portion of the pneumatic bag so that air can be directed completely around the bag. In a first specific embodiment of the latter embodiments a flexible flap may be connected to a forward portion of the deck forward of the forward side of the pneumatic bag so that air can be directed about a bottom side of the bag. In a second embodiment of the latter embodiments a bottom portion of the bag may be provided with openings for discharging air from the bag into the air cushion. In all of the embodiments air is directed over the forward side of the pneumatic bag. With such an arrangement wear on the seal components is minimized.

OBJECTS OF THE INVENTION

An object of the present invention is to overcome the aforementioned problems associated with prior art surface effect ship seals.

Another object is to provide an improved seal for land or water air cushion vehicles.

A further object is to provide an improved seal for a surface effect vehicle wherein the seal is flexible and yet is able to undergo minimum wear under all wave surface conditions.

Yet another object is to provide an air cushion vehicle with a flexible seal which operates with a minimum of wear.

Still another object is to provide an easy to construct and low cost seal for an air cushion vehicle wherein the seal is flexible enough to follow all sizes of waves to minimize leakage and yet is configured to be able to operate in all sizes of waves with a minimum of wear.

Other objects, advantages and novel features of the invention will become apparent from the following detailed description of the invention when considered in conjunction with the accompanying drawings.

DESCRIPTION OF THE PREFERRED EMBODIMENTS

Figure 1:
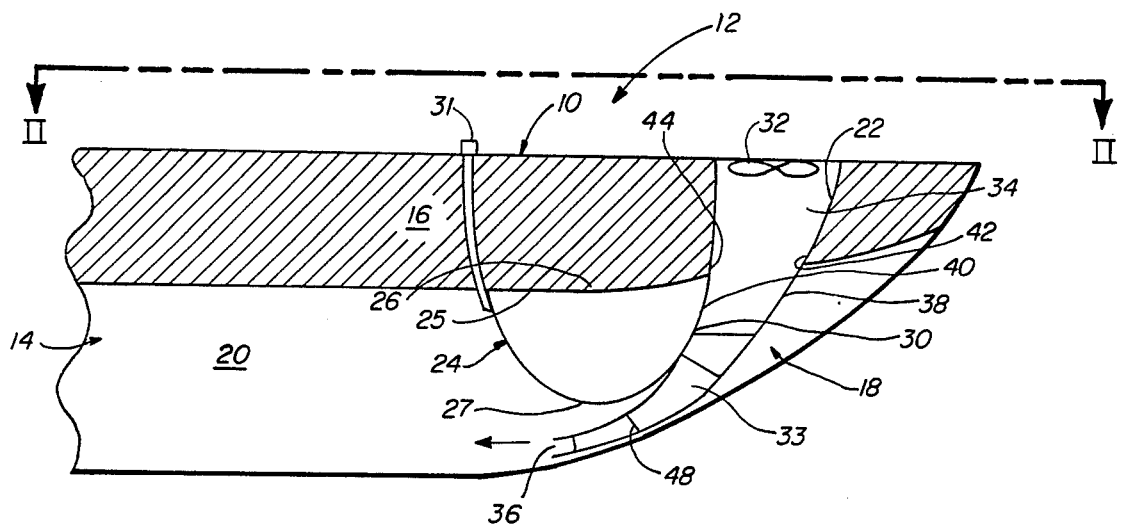
FIG. 1 is a schematic longitudinal cross-sectional view of a bow portion of a surface effect vehicle.

Referring now to the drawings wherein like reference numerals designate like or similar parts throughout the several views there is illustrated in FIGS. 1-6 various embodiments of the invention. All embodiments shown in the drawings include a bow portion 10 of a surface effect ship 12. The surface effect ship 12 includes a pair of spaced apart side hulls 14 which are joined by a wet deck 16. The bow portion 10 of the surface effect ship includes a bow seal, generally shown at 18, so that an air cushion 20 can be formed below the wet deck 16. The forward portion of the deck 16 has an opening 22 for providing an air inlet to the air cushion 20. While the drawings illustrate bow seals it is to be understood that the same components and configurations can be used for stern seals and that the following description is intended to include stern seals as well as bow seals.

As elongated pneumatic bag 24 is mounted along its length to the bottom 25 of the wet deck 16. The bag 24 may have a cylindrical configuration with an elongated flat portion 26 which is attached to the bottom side 25 of the wet deck. The flexible bag 24 may further have an elongated curved portion 27 which extends below the wet deck 16. The bag 24 is sealed at its ends 28, and is positioned to receive air from the deck opening 22 along its forward side 30. The flexible bag may be constructed of rubberized fabric, such as neoprene coated canvass. The bag may be preinflated to a predetermined pressure by a through-the-deck hose and inflation valve 31.

Passageway means are mounted between the side hulls 14 for directing air around the forward side 30 of the bag. Fan means 32, which may be a plurality of fans, are mounted between the side hulls 14 and located between the top of the deck opening 22 and the forward side 30 of the bag for forcing air from the deck opening 22 into the passageway means.

Figure 2:
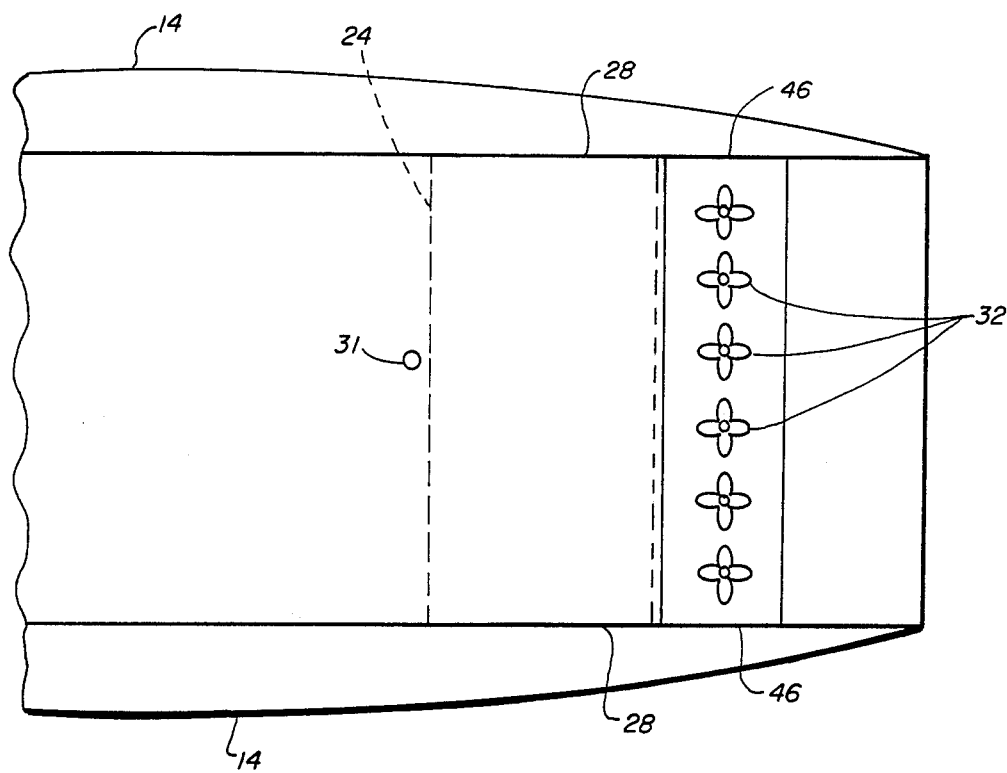
FIG. 2 is a fully extended view taken along plane II—II of FIG. 1.

In the first embodiment of the invention, as shown in FIGS. 1 and 2, the passageway means is a flexible nozzle 33 which has an inlet 34 and an outlet 36. The flexible nozzle is connected at its inlet 34 to the wet deck at its opening 22 for receiving air from the opening 22. The flexible nozzle 33 curves about the forward side 30 of the bag with its outlet 36 being directed in an aft direction. The flexible nozzle 33 may include a pair of substantially rectangular flexible fore and aft sheets 38 and 40 respectively, the aft sheet 40 being shorter in length than the forward sheet 38. The flexible sheets have their top edges connected to the wet deck opening at wet deck fore and aft edges 42 and 44 respectively. The starboard and port sides of the flexible nozzle are closed by flexible sheets 46 which are connected to the side edges of the sheets 38 and 40. When the flexible nozzle is inflated the side sheets 46 are forced against the side hulls 14 to seal the air cushion below the vehicle. The bottom edges of the sheets 38 and 40 form the outlet 36 of the flexible nozzle. The flexible nozzle may be maintained in its curved shape upon inflation by internally located flexible webs or stringers 48 which interconnect the forward and aft flexible sheets 38 and 40. The flexible sheets 38 and 40 may be constructed of a rubberized fabric such as neoprene coated canvass. The pressure created by fans 32 within the nozzle 33 should be approximately 20% greater than the pressure within the bag 24. With these differential pressures the bag will serve as a highly efficient flexible cushion for the shock loading of wave action on the nozzle 33.

Figure 3:
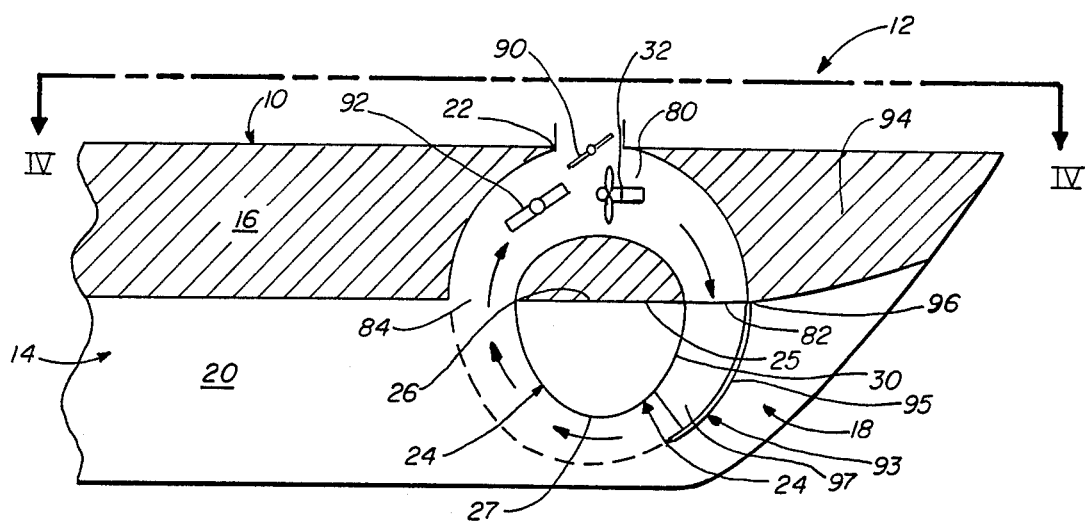
FIG. 3 is a schematic longitudinal cross-sectional view of a bow portion of a surface effect vehicle illustrating a second embodiment of the present invention.

In the second and third embodiments (FIGS. 3-6) the passageway means may include the wet deck having a partial annular passageway 80, about a top portion of the bag. The passageway has forward and aft downwardly directed openings 82 and 84, respectively, into the air cushion 20 so that air can be directed completely about the bag, as illustrated in FIGS. 3 and 5. A damper 90 may be mounted in the deck opening 22 for controlling the entrance of air, and a valve 92 may be mounted in the aft portion of the annular passageway 80 for controlling the return of air around the bag to the fan 32. Air forced forwardly into the annular passageway by the fan 32 will generally follow around the bag due to the Coanda effect. This movement will be enhanced by the suction of the fan 32 to continue this desirable annular flow of air about the bag. This flow can be increased or decreased by selective control of the damper 90 and/or the valve 92. The damper 90 and the valve 92 may be pivoted at opposite side hull locations. In the same manner the fans 32 may be supported by brackets which are located at opposite side hull positions. Electrical power may be supplied to the fans 32 by a deck mounted generator (not shown) connected to the fans by cabling (not shown).

Figure 4:
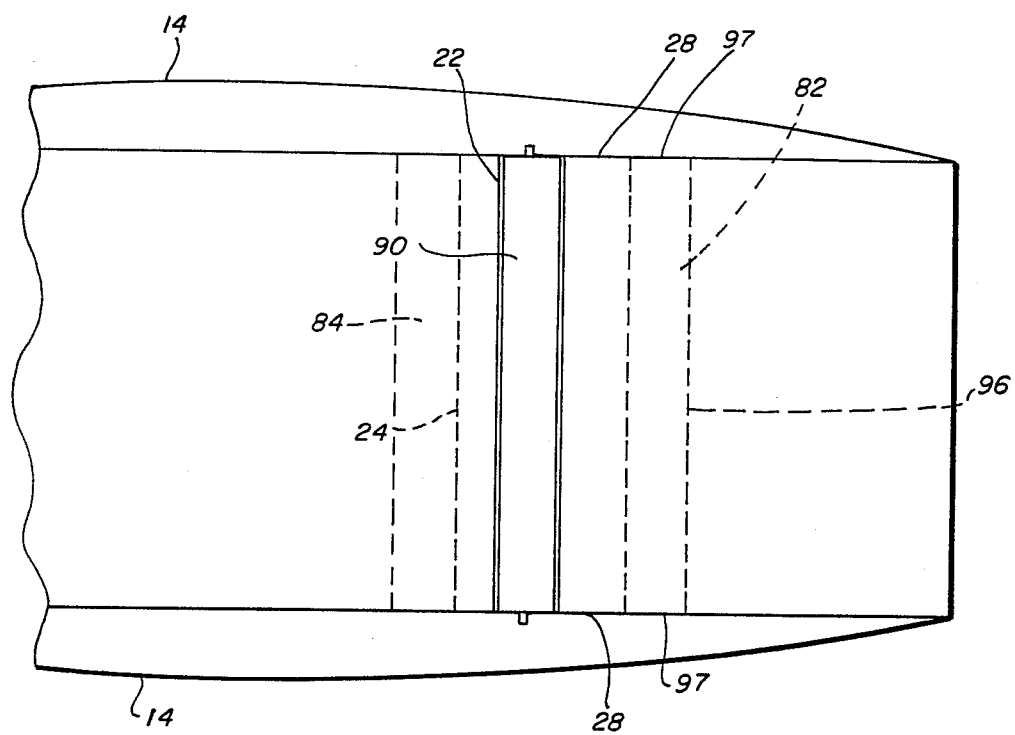
FIG. 4 is a full extended view taken along plane IV—IV of FIG. 3.
Figure 5:
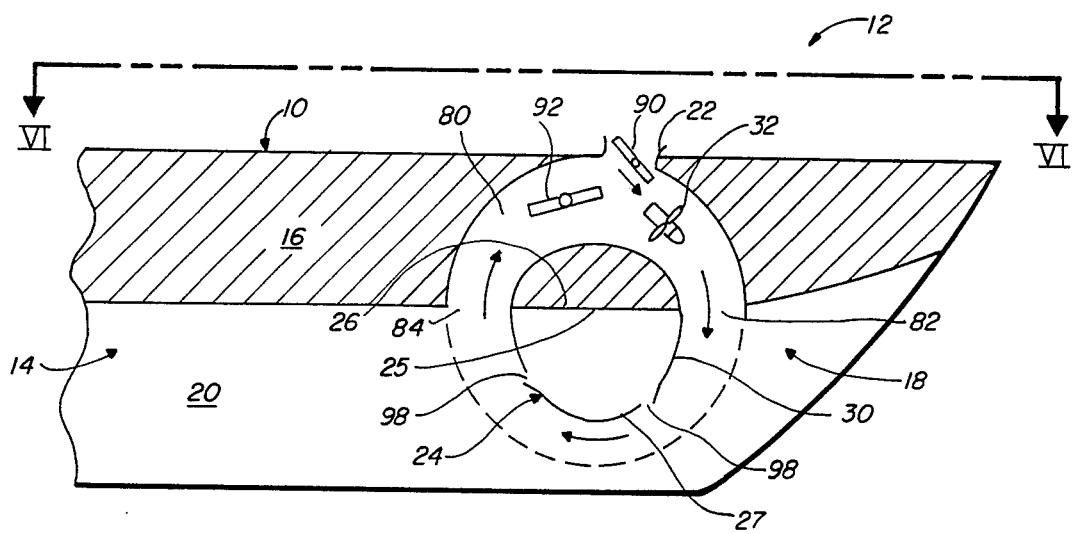
FIG. 5 is a schematic longitudinal cross-sectional view of a bow portion of a surface effect vehicle showing a third embodiment of the present invention.

In the second embodiment shown in FIGS. 3 and 4 the passageway means may further include a flexible nozzle 93 which is connected to a forward portion 94 of the deck forward of the forward side of the bag. The nozzle 93 includes a flexible sheet 95 which is fixedly spaced from the forward side of the bag. This is accomplished by connecting the top edge of the flexible sheet 95 to the deck at the deck edge 96. The flexible sheet 95 extends downwardly and aft from edge 96 into the air cushion for directing air about a bottom side of the bag. The starboard and port sides of the nozzle 93 are sealed by flexible sheets 97 which are also connected to the bag 24. It should be noted that the connection of the flexible sheets 97 to the bag 24 will maintain the shape of the nozzle 93. The bottom edge of the flexible sheet 85 forms a nozzle outlet with the forward side of the bag for directing air about the bottom side of the bag.

Figure 6:
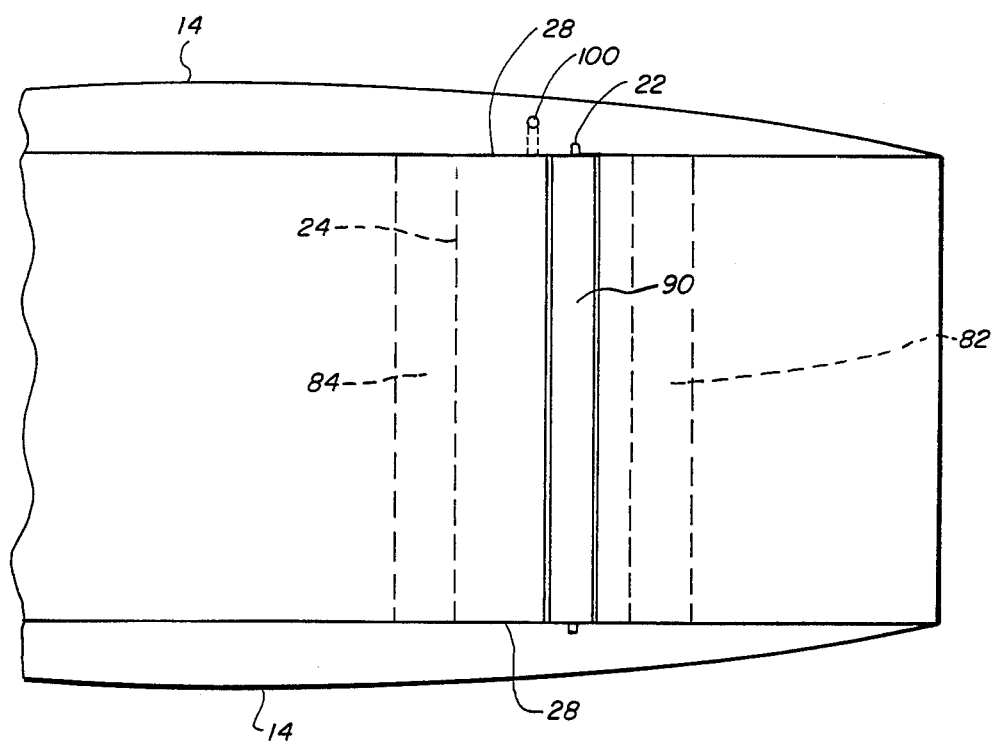
FIG. 6 is a fully extended view taken along plane VI—VI of FIG. 5.

A third embodiment of the invention is illustrated in FIGS. 5 and 6. This embodiment differs from the embodiment illustrated in FIGS. 3 and 5 by providing the bag 24 with elongated openings 98 for discharging air from the bag into the air cushion 20. Provision for supplying air to the bag may be through a hose and valve assembly 100 which extends from the end of the bag upwardly through one of the side hulls to a top deck location where a pump (not shown) can be connected. This embodiment, which may be referred to the "blown seal", can utilize the air emanating from the openings 98 to enhance the Coanda effect. The air blown over the bag will entrain and turn the jet air around the bag perimeter so it can be used by the fan 32. The bag pessure can be maintained to that required to give optimum pressure ratios for the circulation control air jets. The "blown seal" embodiment eliminates the requirement of any fabric nozzle entirely and will produce maximum air gaps at minimum cushion power.

Obviously many modifications and variations of the present invention are possible in the light of the above teachings. It is therefore to be understood that within the scope of the appended claims the invention may be practiced otherwise than as specifically described.

What is claimed is:

1. In a surface effect vehicle having a pair of spaced apart side hulls joined by a wet deck and a seal extending between the side hulls so that an air cushion can be formed, an improved seal comprising:
   a forward portion of the deck having an opening for providing an air inlet to the air cushion;
   an elongated pneumatic bag mounted along its length to the bottom of the wet deck and positioned to receive air from the deck opening along its forward side;
   passageway means mounted between the side hulls for directing air around the forward side of the bag, and fan means mounted between the side hulls and located between the top of the deck opening and the forward side of the bag for forcing air from the deck opening into said passageway means.

2. In a surface effect vehicle having a pair of spaced apart side hulls joined by a wet deck and a seal extending between the side hulls so that an air cushion can be formed, an improved seal comprising:

a forward portion of the deck having an opening for providing an air inlet to the air cushion;

an elongated pneumatic bag mounted along its length to the bottom of the wet deck and positioned to receive air from the deck opening along its forward side;

passageway means mounted between the side hulls for directing air around the forward side of the bag, said passageway including:

a flexible nozzle having an inlet and an outlet, the flexible nozzle being connected at its inlet to the wet deck at said opening for receiving air from the opening; and the flexible nozzle curving about the forward side of the bag with its outlet being directed in an aft direction.

3. An improved seal as claimed in claim 2 including:
fan means mounted between the side hulls and located between the deck opening and the forward side of the bag for forcing air from the deck opening into the flexible nozzle.

4. An improved seal as claimed in claim 2 including the bag having a cylindrical sector configuration with an elongated flat portion thereof being attached to the bottom side of the wet deck and with an elongated curved portion thereof extending below the wet deck.

5. An improved seal as claimed in claim 2 including:
the flexible nozzle including a pair of substantially rectangular flexible sheets and end flexible sheets which are joined at their edges;
the rectangular flexible sheets having top edges which are connected to the wet deck at said opening and bottom edges which form the outlet of the nozzle.

6. In a surface effect vehicle having a pair of spaced apart side hulls joined by a wet deck and a seal extending between the side hulls so that an air cushion can be formed, an improved seal comprising:

a forward portion of the deck having an opening for providing an air inlet to the air cushion;

an elongated pneumatic bag mounted along its length to the bottom of the wet deck and positioned to receive air from the deck opening along its forward side;

passageway means mounted between the side hulls for directing air around the forward side of the bag, said passageway including:

the wet deck having a partial annular passageway located about a top portion of the bag, said passageway having forward and aft downwardly directed openings into the air cushion so that air can be directed completely about the bag.

7. An improved seal as claimed in claim 6 including:
fan means mounted in the partial annular passageway between the deck opening and the forward passageway opening for forcing air downwardly and about the forward side of the bag.

8. An improved seal as claimed in claim 6 including:
the bag having a cylindrical sector configuration with an elongated flat portion thereof being attached to the bottom side of the wet deck and with an elongated curved portion thereof extending below the wet deck.

9. An improved bow seal as claimed in claim 6 wherein the passageway means further includes:

a longitudinal flexible sheet connected at a top edge to the forward portion of the deck forward of the forward side of the bag and flexible sheets connected between end edges of the longitudinal flexible sheet and the bag; and the longitudinal sheet being spaced from the forward side of the bag by its connection to the deck and the longitudinal flexible sheet extending downwardly and aft from the connection into the air cushion for directing air about a bottom side of the bag.

10. An improved seal as claimed in claim 9 including:
fan means mounted in the partial annular passageway between the deck opening and the forward passageway opening for forcing air downwardly and about the forward side of the bag.

11. An improved seal as claimed in claim 10 including:
the bag having a cylindrical sector configuration with an elongated flat portion thereof being attached to the bottom side of the wet deck and with an elongated curved portion thereof extending below the wet deck.

12. An improved seal as claimed in claim 11 including:
the longitudinal flexible sheet having a bottom edge which forms with the forward side of the bag a nozzle outlet for directing the air about the bottom side of the bag.

13. An improved seal as claimed in claim 12 including:
a damper mounted in said deck opening.

14. An improved seal as claimed in claim 13 including:
a valve mounted in said partial annular passageway aft of the fan means and said deck opening.

15. An improved seal as claimed in claim 6 including:
a bottom portion of the bag having openings for discharging air from the bag into the air cushion.

16. An improved seal as claimed in claim 15 including:
fan means mounted in the partial annular passageway between the deck opening and the forward passageway opening for forcing air downwardly and about the forward side of the bag.

17. An improved seal as claimed in claim 16 including:
the bag having a cylindrical sector configuration with an elongated flat portion thereof being attached to the bottom side of the wet deck and with an elongated curved portion thereof extending below the wet deck.

18. An improved seal as claimed in claim 17 including:
a damper mounted in said deck opening.

19. An improved seal as claimed in claim 18 including:
a valve mounted in said partial annular passageway aft of the fan means and said deck opening.

* * * * *